United States Patent [19]
Fabris et al.

[11] Patent Number: 5,299,986
[45] Date of Patent: Apr. 5, 1994

[54] DIFFERENTIAL LOCK DEVICE

[75] Inventors: Armando Fabris, Campodarsego; Ivano Visentini, Caltana S. Maris di Sala; Antonietto Raniero, S. Andrea di Vigonza, all of Italy

[73] Assignee: Carraro S.p.A., Campodarsego, Italy

[21] Appl. No.: 822,099

[22] Filed: Jan. 17, 1992

[30] Foreign Application Priority Data

Jan. 21, 1991 [IT] Italy ............... PD91A000014

[51] Int. Cl.⁵ ............................................. F16H 1/45
[52] U.S. Cl. ...................................... 475/88; 475/231
[58] Field of Search ............ 192/59, 60, 85 A, 103 F; 475/88, 231

[56] References Cited

U.S. PATENT DOCUMENTS

| | | | |
|---|---|---|---|
| 492,625 | 2/1893 | Fraser | 192/85 A |
| 2,244,207 | 6/1941 | Lorton | 192/60 X |
| 2,498,801 | 2/1950 | Fraser | 192/60 |
| 2,720,297 | 10/1955 | Arvidson | 192/60 |
| 3,229,794 | 1/1966 | Fraser | 192/60 |
| 3,490,312 | 1/1970 | Seitz et al. | 192/103 F X |
| 3,546,969 | 12/1970 | Gibson et al. | 475/88 |
| 3,577,803 | 5/1971 | Mueller | 192/60 X |
| 3,831,461 | 8/1974 | Mueller | 192/60 X |
| 3,916,728 | 11/1975 | Behar et al. | 475/231 |
| 4,012,968 | 3/1977 | Kelbel | 192/85 AA X |
| 4,041,804 | 8/1977 | Clark | 475/88 |
| 4,445,400 | 5/1984 | Sullivan et al. | 192/85 AA X |
| 4,456,110 | 6/1984 | Hanks et al. | 192/85 A X |
| 4,921,085 | 5/1990 | Takemura et al. | 192/60 |
| 4,957,473 | 9/1990 | Takemura et al. | 192/60 X |
| 4,958,711 | 9/1990 | Okubo et al. | 192/60 |
| 5,087,228 | 2/1992 | Johansson | 475/88 |
| 5,103,642 | 4/1992 | Suzuki et al. | 192/59 X |
| 5,106,347 | 4/1992 | Takemura et al. | 192/60 X |

FOREIGN PATENT DOCUMENTS

| | | | |
|---|---|---|---|
| 54-113758 | 9/1979 | Japan | 475/88 |
| 61-82048 | 4/1986 | Japan | 475/88 |
| 1-74343 | 3/1989 | Japan | 475/88 |
| 405429 | 2/1934 | United Kingdom | 192/59 |

Primary Examiner—Leslie A. Braun
Assistant Examiner—Khoi Ta
Attorney, Agent, or Firm—Sughrue, Mion, Zinn, Macpeak & Seas

[57] ABSTRACT

The transmission includes a hydraulically operated actuator for selectively controlling a locking mechanism for a differential mechanism interconnecting a motion input shaft and at least two motion output shafts. The lubricant for the differential mechanism is supplied by a pump to an actuator for the lock device with the pump being driven from the motion input shaft. In one embodiment, the pump and the actuator are disposed in a support for the differential mechanism. In a second embodiment, the pump is mounted on the housing and is provided with a reciprocating piston driven by a rotatable cam mounted for rotation with the differential casing. The plunger is biased in one direction by a spring in such a manner that the plunger is driven for a suction stroke by the cam and for a delivery stroke by the spring.

11 Claims, 4 Drawing Sheets

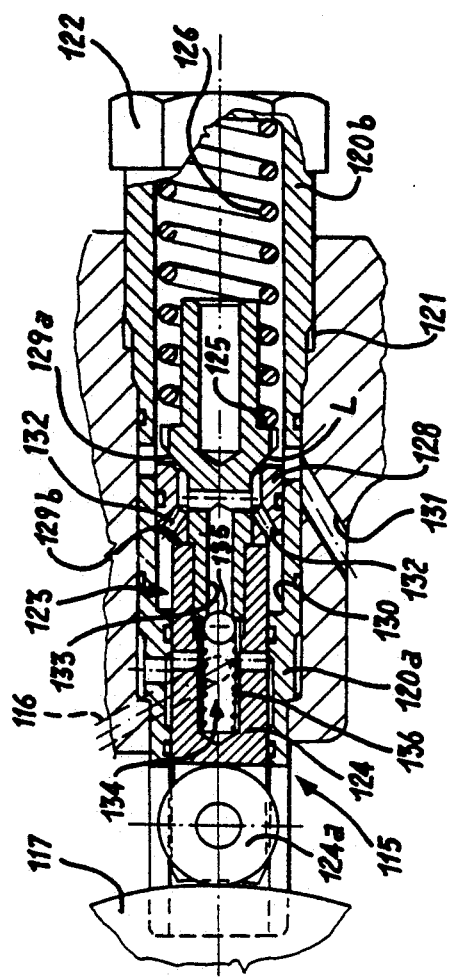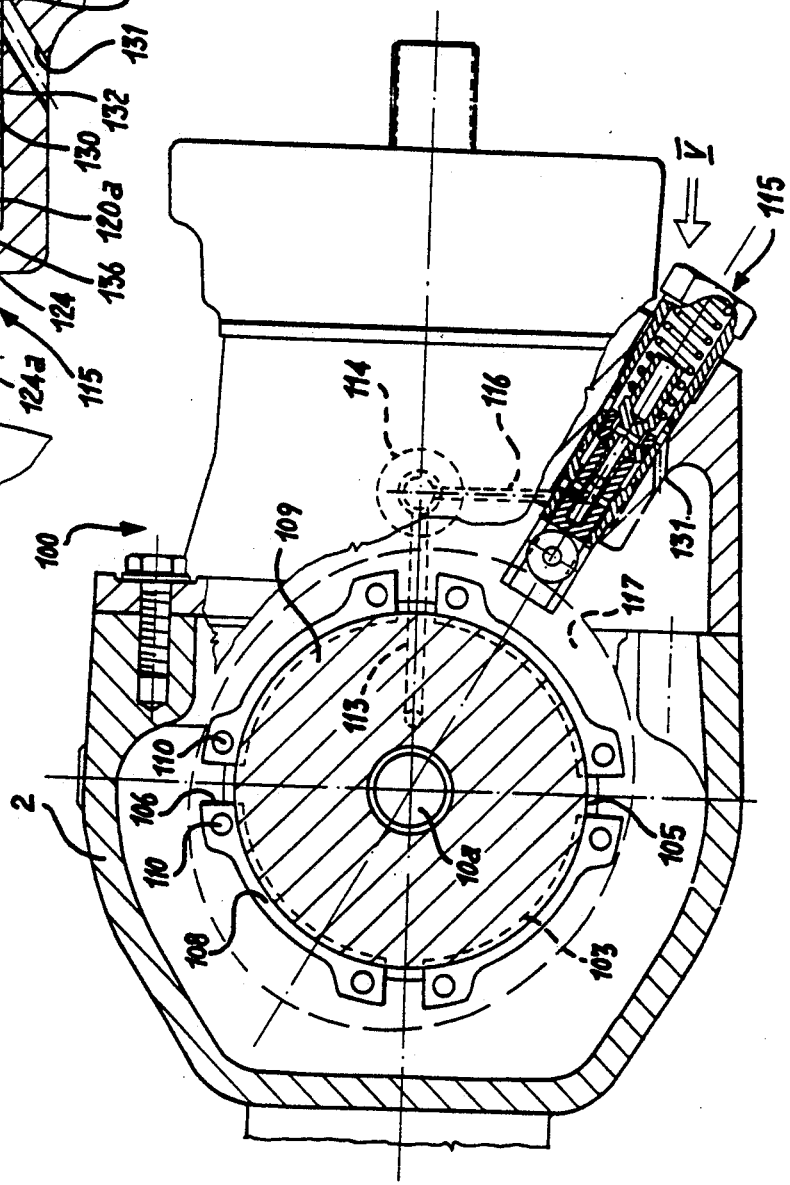

DIFFERENTIAL LOCK DEVICE

BACKGROUND OF THE INVENTION

This invention relates to a transmission for vehicles of a kind which comprises:

a motion input shaft and at least two motion output shafts interconnected by a differential mechanism, a storage reservoir for a differential mechanism lubricant, a device for locking said differential mechanism, a hydraulically operated actuator for selectively operating said locking device, and a means of admitting a pressurized medium to said actuator.

A transmission with the above features is known, for example, from German Utility Model of DE-G 8911619.4.

In that transmission, the arrangement for operating the hydraulic differential lock actuator includes a piston pump which is driven by the rotational speed differential between the two crown wheels of the differential mechanism wherever a condition of the kind of a wheel spin occurs.

Accordingly, that structure only allows the differential to be locked after either wheel has entered a spinning condition. Thus, the differential can be locked neither ahead of a spin nor as both wheels of one axle are spinning at the same rate. In addition, with the differential locked, the actuator would be fed no more medium, and in the event of a leaky actuator, the differential locking action could soon become ineffectual.

On the other hand, there exist situations in the operation of a vehicle wherein the differential lock is expected to be operative with no difference in rotational speed between the wheels, such as preparatory to critical runs where even a temporary spin condition could defeat the vehicle capability to proceed or when the differential is locked to counteract the tendency of a vehicle to wander from a straight line travel path.

The transmission of the above-mentioned German Utility Model shows to be quite unsuited to such situations.

The pump linked operatively to the differential lock is, moreover, supplied with a medium stored in a separate reservoir from any storage reservoir for the differential lubricant.

It follows that, additionally to the need for a dedicated system branch-off for the delivery and return flows of the medium, usually an oil, to/from the actuator, any leakage therefrom may result in undesirably flooding the axle or at least the actuator case. It matters to observe that the working oil for the actuator is not always to the same specifications and composition as that intended for lubricating the differential, so that undesired problems may be caused by the two oils getting mixed together.

Further, also on this same account, the actuators require the provision of suitable seals and gaskets which, besides involving precision machining of the sealed surfaces, may become damaged or worn and result over time in the aforesaid leaky and flooded conditions.

The technical problem that underlies this invention is to provide a transmission whose construction and performance features can obviate the above-noted drawbacks with which the prior art is beset.

SUMMARY OF THE INVENTION

This problem is solved according to the invention by a transmission as indicated being characterized in that said medium is the same as the lubricant for said differential mechanism, and that said admitting means comprises a pump driven off the motion input shaft.

Advantageously, the pump and differential mechanism are mounted in a common case which defines said lubricant storage reservoir, and the pump has a dip tube in said reservoir.

In a further aspect of the invention, the pump is of the reciprocating kind and has a plunger driven through a camming means, one of said pump and said camming means being held stationary with said case, and the other of said camming means and said pump being rotated by said motion input shaft. Preferably, the pump is attached to the case, and the camming means is attached to a differential mechanism case.

It is also arranged for the camming means to be active on the plunger against the bias from a spring so disposed in relation to the plunger and the camming means as to have the plunger driven in the suction stroke by the camming means and in the delivery stroke by the spring. With this construction, the top delivery pressure can be correlated to the elastic bias from the spring to do away with the need for pressure relief valves. Further, the spring and the delivery side surfaces of the plunger exposed to the delivery pressure can be sized such that the plunger would automatically become disengaged from the camming means upon a predetermined delivery pressure of the medium being reached. A pump with these features could also be used with any rotary shaft not necessarily incorporated to a transmission of a vehicle, as a means of admitting a pressurized medium into a hydraulic actuator.

BRIEF DESCRIPTION OF THE DRAWINGS

The invention will be now described in detail with reference to two exemplary embodiments thereof, shown by way of illustration and not of limitation in the accompanying drawings, in which:

FIG. 4 is a sectional view taken along line IV—IV in FIG. 3; and

FIG. 5 is an enlarged scale view of a detail indicated by arrow V in FIG. 4.

Figure 1:
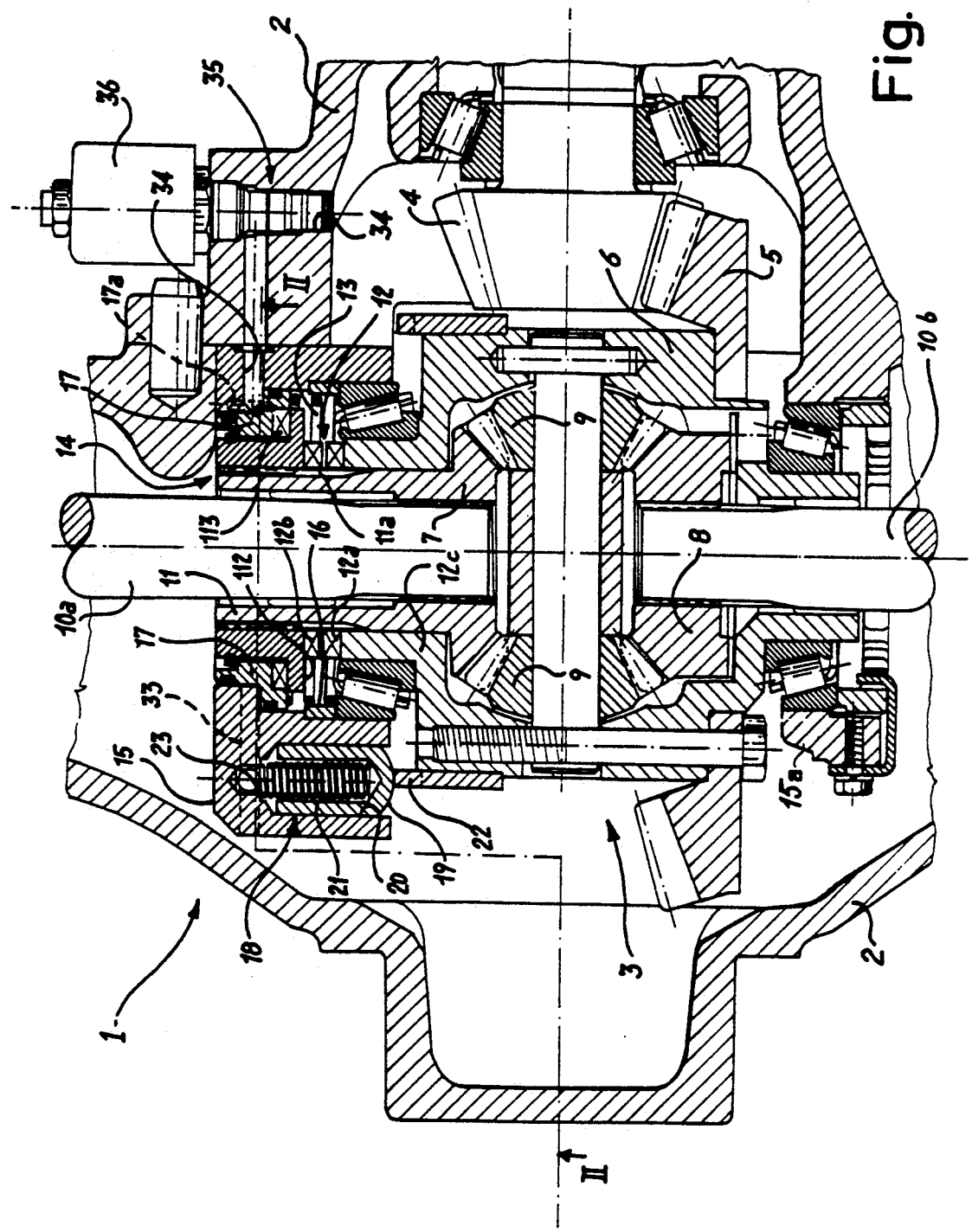
FIG. 1 is a fragmentary, longitudinal section view of an axle of a vehicle incorporating a transmission according to the invention.

In the drawing views, generally indicated at 1 is a drive axle (only partially depicted) for a vehicle, now shown.

The axle 1 comprises a housing 2 having a transmission mounted on its interior which includes a shaft 3a and two axle shafts 10a,b interconnected by a differential mechanism 3. The shaft 3a, being normally a drive shaft, will be also referred to herein as the motion input shaft; likewise, the two axle shafts will be also termed the motion output shafts.

The differential mechanism 3 is of the oil-bath, bevel gear variety, that is splash lubricated with oil or some other liquid lubricant stored within the housing 2. It is driven through a pinion gear 4 in mesh engagement with a gear wheel 5, and comprises a case 6 having two crown wheels 7, 8 mounted therein which enmesh together through idle planet gears, all denoted by 9.

The crown wheels 7, 8 are, in turn coupled for rotation with a limited scope for axial movement to respective axle shafts 10a,b as associated with corresponding wheels of the vehicle (not shown).

Figure 2:
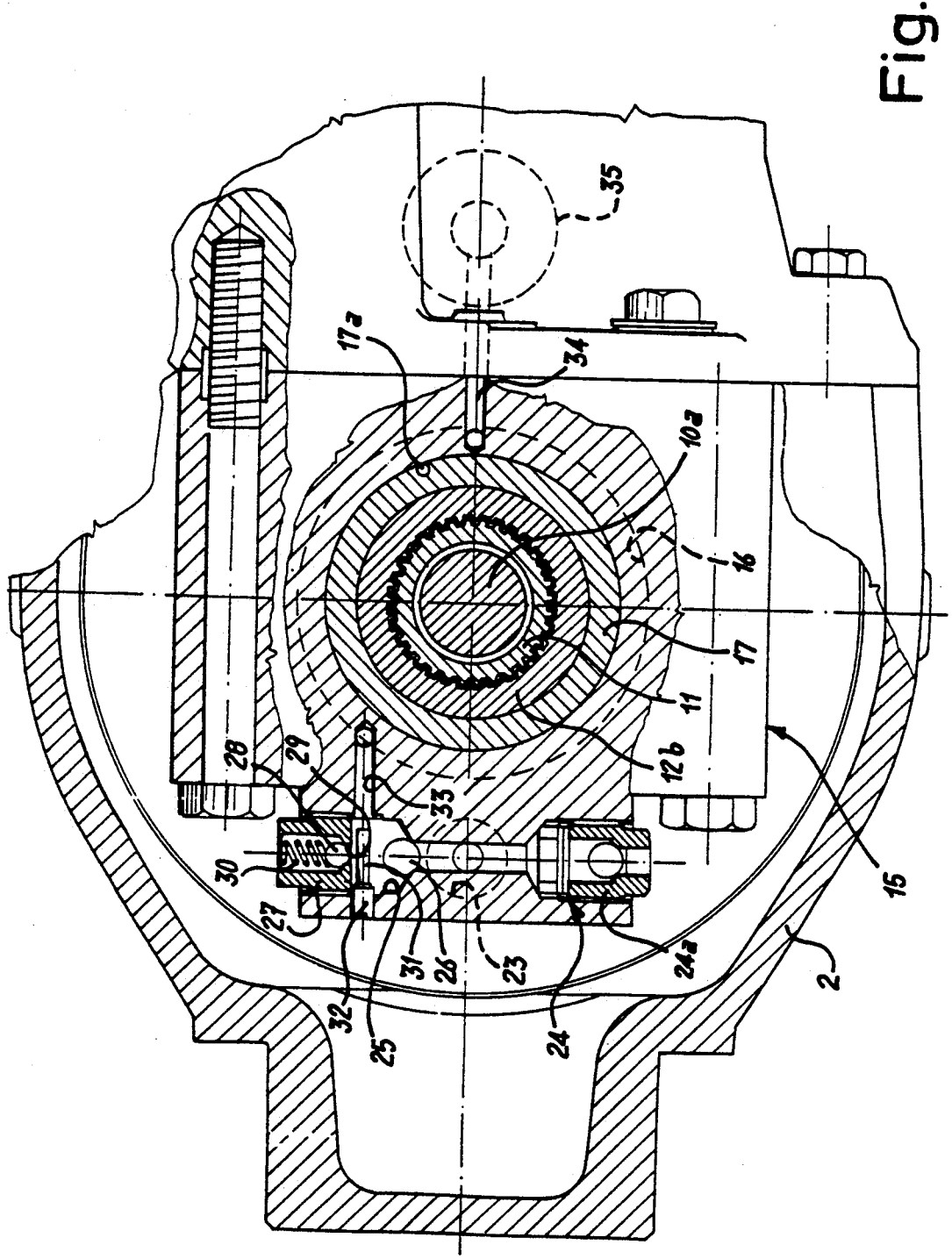
FIG. 2 is a sectional view taken along line II—II in FIG. 1 and showing that same axle.

With specific reference to FIGS. 1 and 2, crown wheel 7 is provided with a cylindrical tang having a section 11 extended axially to the outside of case 6 and formed externally with splines 11a.

To lock the differential mechanism 3 such that no differential function be served between the axle shafts 10a,b, a dog clutch, generally shown at 12, is arranged to utilize, when operated, one of the crown wheels rotatively with the case 6. The clutch 12 includes a first clutch member 12a, being rigid for rotation with the case 6, formed with a collar 12c on its free end which surrounds the tang of crown wheel 7, and adapted to releasably engage for rotation with a second clutch member 12b, which is made rotatively rigid with crown wheel 7 by sliding keyed engagement on the splined section 11a thereof. By fitting the second clutch member 12b slidably over the tang 11 of crown wheel 7 rather than directly over the axle shaft 10a, it becomes possible to prevent said clutch member from performing undesired axial movements, such as are instead performed by the axle shaft on a turn. It should be considered that undesired axial movements of clutch member 12b could result in the differential mechanism being locked incidentally, and this on a turn, due to it becoming engaged with clutch member 12a.

Said members 12a,b are normally held uncoupled by a coil spring 13 and engaged with each other, when the differential is to be locked, by means of a hydraulically operated actuator, generally shown at 14.

This actuator 14 comprises a support, generally shown at 15, which is affixed to the housing 2 of axle 1 and forms one of the two supports 15, 15a for the differential mechanism. This support 15 has a cylindrical cavity 16 formed centrally therein which houses an annular piston 17 coaxial with its corresponding axle shaft 10a. This piston 17 is slidable tightly within the cavity 16 but is made rigid for rotation with support 15 by a pin 17a. It is active on a flange 112 of clutch member 12b through a bearing 113. The piston 17 and cavity 16 jointly define an infeed chamber for a pressurized medium to operate the actuator 14. In accordance with the invention, the medium to be supplied into said chamber is the same liquid lubricant as is contained in the case 2 for lubricating the differential mechanism 3.

To supply said medium, usually a pressurized oil, into the chamber adjoining the piston 17, a pump 18 is provided which includes a plunger 19, set slidable in a tight fashion within a cylindrical cavity 20 against the bias of a spring 21. The pump 18 operates on the principle that its plunger 19 is reciprocated by a cam ring 22 secured peripherally on the case 6 of the differential mechanism 3 as relative rotation occurs between said case and the axle housing 2, that is as the axle is set in motion.

The chamber 20 of the pump 18 is in fluid communication through a hole 23 with a dip tube 24 which has a ball-type, one-way bottom valve 24a normally immersed in the housing 2 oil, and with a delivery conduit 25, also shut off by a ball-type one-way valve 26. Provided in the delivery conduit 25 in a pressure relief valve 27 having a ball 28 which is biased to block an orifice 29 by elastic pre-load on a spring 30. To prevent the all of valve 26 from harming the orifice 29 or the ball 28 in its opening movement, protection is advantageously provided by a tang 31 of a plug 32 fitting into a machining bore for a branch-off 33 from the delivery conduit connecting the latter to the infeed chamber for the pressurized medium.

From this same chamber there extends a discharge conduit 34 for the pressurized medium, which again opens into the housing 2 and has a section formed in the support 15 and the remaining section in the axle housing 2. The conduit 34 is selectively shut off by a solenoid valve 35 which is operated through a solenoid 36 located on the housing 2 outside and, therefore, readily accessible for servicing.

With the vehicle running, rotation of the case 6 relatively to the axle housing, and hence of the cam ring 22 relatively to the plunger 19, will result in the plunger being reciprocated within the chamber 20 and the pump 18 being operated. The oil stored within the housing 2 is drawn up through the dip tube 24 and directed to flow under a pressure through the intake conduit 25 and branch line 33 into the infeed chamber of actuator 14. With the solenoid valve 35 in the open condition, the oil supplied to the actuator 14 through the intake conduit 25, 33 is freely discharged through the discharge conduit 34 without this affecting in any way the clutch 12, which will therefore remain disengaged.

When the differential mechanism is to be locked, the solenoid of valve 35 is energized to shut off the discharge conduit 34. Thus, the actuator 14 will be initially operated to engage the clutch members 12a,b together. Then, on the setting pressure of the relief valve 27 being exceeded, excess delivery of pressurized oil from the pump 18 is disposed of through the latter until, as the need to have the differential locked is removed, the solenoid valve 35 is returned to its open condition.

Figure 3:
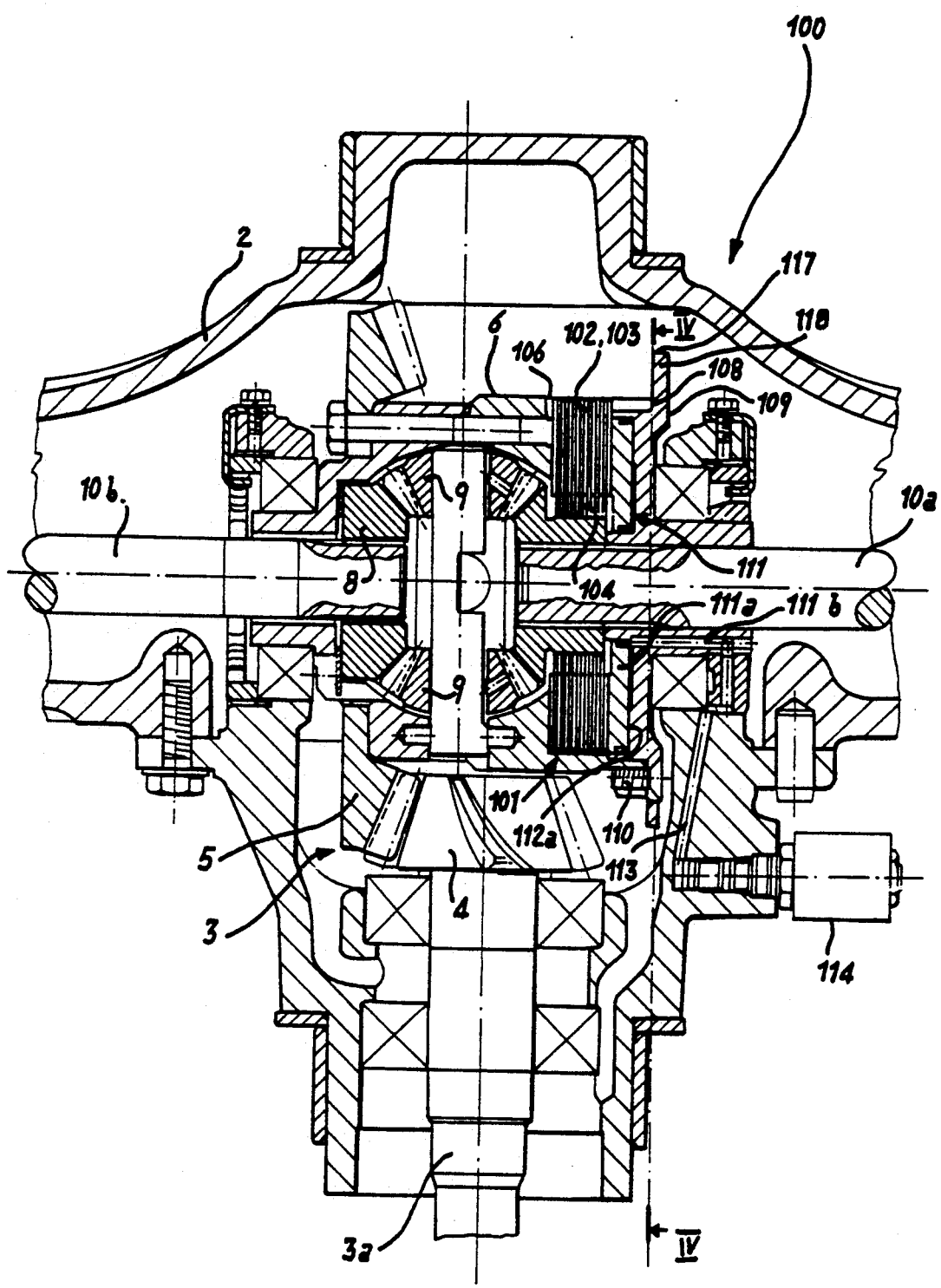
FIG. 3 is a longitudinal section view similar to FIG. 1, showing a second embodiment of this invention.

Shown in FIGS. 3 to 4 is a modified embodiment of the transmission according to the invention, generally indicated at 100, which is again incorporated to an axle with a housing 2. Similar parts to those described in connection with the former embodiment are denoted by the same reference numerals.

To lock the differential mechanism 3 of the transmission 100, a friction clutch generally shown at 101 is provided whose clutch members comprise, not unlike the dog clutch 12 of the former embodiment, a package of discs and counter-discs 102, 103 made rotatively rigid with a splined tang 104 of crown wheel 7 and the case 6, respectively. The counter-discs are each provided with four teeth 105 projecting radially outwards and being engaged in corresponding notches 106 formed in the skirt of case 6. The latter has in its portion corresponding with the crown wheel 7, a mouth 108 removably closed by a lid 109. The notches 106 open to the mouth 108 so as to facilitate insertion and/or removal of the disc and counter-disc package. However, the construction of the case 6 is to weakened thereby, the arrangement being such that the lid 109 is attached to the case 6 by means of screws 110 on either sides of the notches to constitute an element of mechanical continuity of the skirt of case 6 across the open end of each notch.

The friction clutch 101 is operated through a hydraulic piston actuator 111 effective to clamp the dies and counter-discs together and including an annular piston 111a set slidably in a tight fashion within an annular chamber 112a formed in the surface of the lid 109 to face the case 6 interior in a coaxial position with its corresponding axle shaft.

The actuator 111 is connected to a pressurized oil intake conduit 111b along which a shut-off valve means is provided, such as a solenoid valve 114 mounted on the case 2 to be accessible from outside the axle. The solenoid valve 114 is adapted to selectively connect the conduit 111h to discharge into the housing 2, when the differential mechanism 3 is to be held in the released state, or to a delivery conduit 116 from a piston pump generally shown at 115.

The pump 115 is driven through a cam 117 provided by a suitably shaped radial flange 118 of the lid 109. The cam 117 may be alternatively attached to the lid, the case, or any other part driven directly off the shaft 3a. Said pump 115 comprises a split tubular body into two portions 120a,b which are structurally independent of each other. Portion 120a is a tight press fit in a seat 121 in the housing 2; portion 120b fits threadably into seat 121 and projects outwards from the housing 2 with a key-shaped end 122.

The tubular body accommodates a plunger 123 whose rod 124 carries on one end a cam-following roller 124a engaging on the profile of the cam 117, and on the other end, a shoulder 125 for a coil spring 126 between the rod 124 and the portion 120b to continuously bias the rod 124 elastically into contact engagement with the cam 117. By fitting shims between the tubular body p portion 120b and the spring 126 it becomes possible to control the elastic pre-load of the latter.

Mounted on the rod 124 at an intermediate location thereon is a tubular piston 128 having a predetermined axial play between two shoulders indicated at 129a,b, respectively. In particular, it should be noted that this piston is movable toward and away from a stopped condition against shoulder 129a to block, in a manner to be explained, a port L defined between it and said shoulder. Said piston, moreover, is dragged slidingly by the rod 124 in the tubular body portion 120a to delimit an annular chamber 130 with it and the rod.

The pump 115 is supplied through a suction conduit or dip tube 131 so located within the housing 2 as to be normally immersed in the transmission lubricating oil and extending between the housing and the tubular body of the pump to open into an annular interspace delimited between the portions 120a,b. With the piston 128 abutted against the shoulder 129b, and, therefore, the port L in the open condition, the dip tube 131 is in fluid communication with chamber 130 through a plurality of holes 132 obtained through the said piston. To the contrary, with the piston 128 abutted against the shoulder 129a, to close the port L, said dip tube 131 would be shut off.

Formed through the rod 124 is an axial conduit 133 provided with a one-way valve 134 having a ball shutter 135 biased elastically to close a corresponding seat by a spring 136. The conduit 133 is in fluid communication with the pump delivery conduit 116 at on end, and with the chamber 130 through the holes 132 at the other end.

Starting with an initial condition whereby the differential mechanism 3 is released and there is no oil pressure within the delivery conduit 116 of the pump 115, as the motion input shaft 3a is rotated, cam 117 is rotated rigidly with the case 6 to drive the pump 115. The pump is caused to perform a suction stroke as the plunger 123 is pushed by the cam 117 against the spring 126 toward the tubular body portion 120b. During this suction stroke, the components of the pump 115 arrange themselves in the position shown in FIGS. 4 and 5, with the piston 128 abutted against the shoulder 129b and the port L uncovered. As a result of the piston movement, oil is drawn into the chamber 130 through the dip tube 131. The one-way valve 134 prevents oil from flowing backwards from the delivery conduit 116.

A delivery stroke of the pump 115 takes place as the plunger 123 is moved by the spring 126 toward the cam 117. During this delivery stroke, the piston 128 is first caused to abut against the shoulder 129a and block the port L, thereby shutting off the dip tube and preventing oil from flowing back through it; in this way, the piston 128 forms a one-way valve means for the dip tube. Then, oil compressed by the elastic bias from the spring 126 is forced from the chamber 130, through the holes 132, into the axial conduit 133, and on overcoming the resistance from the spring 136 of the one-way valve 134, is admitted to the delivery conduit 116. It should be noted that, upon the oil pressure in the delivery conduit 116 reaching a level counter-balancing the elastic bias from the spring 126, the pump 115 is halted with the plunger 123 in a position which corresponds to full suction stroke and, therefore, no longer affected by the action of the cam 117. This at one time limits the top pressure of the oil in the delivery conduit and avoids unnecessary operation of the pump when the oil pressure is called for. However, pressurized oil is still maintained within the delivery conduit in case of need.

When the differential mechanism 3 is to be locked, the solenoid valve 114 is energized to fluid-wise communicate the delivery conduit 116 to the supply conduit 111b of the actuator. The piston 111a is thus moved to clamp the disc and counterdisc package 102, 103 and unitize the crown wheels 7, 8 with the case 6.

Several advantages are afforded by this invention over the aforementioned prior art. Among these is that the differential mechanism lock, or more generally the clutch control mechanism, is self-supplied from the hydraulic standpoint, which allows installation of an axle so equipped on a vehicle without requiring adaptation or connection of respective hydraulic systems. In addition, by using the same lubricating liquid for the pressurized medium, there can be no problems of leakage to the axle interior from the actuator. Also, by changing the profile of the annular cam which drives the pump plunger, so as to provide for pitched repetitions of same along the cam path, it becomes possible to produce repeated operation of the plunger at each revolution of the case about its axis, which ensures adequate oil flow rates while the vehicle is being run at low speeds. On the other hand, with reference in particular to the first example shown, by utilizing well-known hysteresis phenomena to size the spring acting on the plunger and the profile of the annular cam, the plunger can be held substantially stationary to produce no pumping action when the differential case is rotated at a high speed.

Furthermore, with particular reference to the second embodiment of this invention, the forces involved with the compression of the package of discs and counterdiscs are balanced by the differential case and cause no stress on the supports for the differential mechanism.

It is also to be observed that this invention is adapted to be easily applied to existing vehicles which can be modified locally at the user premises.

We claim:

1. A transmission for vehicles, comprising:
   a housing having a differential mechanism therein;
   a motion input shaft and at least two motion output shafts interconnected by said differential mechanism in said housing, said differential mechanism including a differential case rotatably mounted in said housing on first and second support means, a storage reservoir in said housing for a differential mechanism lubricant, locking means for locking said differential mechanism, a hydraulically operated actuator for selectively operating said locking device, and pump means in communication with said reservoir for supplying said lubricant under pressure to said actuator, wherein said pump means is operatively driven off the motion input shaft and said pump means and said actuator are disposed in one of said first and second support means for said differential case.

2. A transmission according to claim 1, wherein said pump means and said differential mechanism are mounted within a common housing defining said lubricant storage reservoir, said pump means being provided with a dip tube extending into said reservoir.

3. A transmission according to claim 2, wherein said pump means is a reciprocating pump having a plunger driven through a camming means, one of said camming means and said pump being held stationary to said housing, and the other of said camming means and said pump being rotated by said motion input shaft.

4. A transmission according to claim 1, wherein said pump means comprises a supply conduit for said actuator which connects in a direct and continuous fashion the pump to the actuator, and a discharge conduit from said actuator open into said housing, a valve being arranged to selectively shut off said discharge conduit and operate said actuator.

5. A transmission according to claim 4, wherein a pressure relief means is provided in a passage between the pump and the valve.

6. A transmission for a vehicle comprising:

a housing having a differential mechanism therein;

a motion input shaft and at least two motion output shafts interconnected by a differential mechanism, a storage reservoir in said housing for a differential mechanism lubricant, locking means for locking said differential mechanism, a hydraulically operated actuator for selectively operating said locking device, and pump means in communication with said reservoir for supplying said lubricant under pressure to said actuator, wherein said pump means is mounted on said housing and includes a reciprocating plunger driven through a camming means rotated by said motion input shaft, and wherein said camming means is active on said plunger against a spring so arranged in relation to the plunger and the camming means as to have the plunger driven for a suction stroke by the camming means and for a delivery stroke by said spring.

7. A transmission according to claim 6 wherein said pump means is mounted in a seat extending through said housing whereby said pump is accessible from outside said housing.

8. A transmission according to claim 6, wherein said spring is subjected to an adjustable elastic pre-load.

9. A transmission according to claim 6, wherein said pump includes a tubular casing housing said spring, said plunger, the first and second one-way valve means respectively arranged unidirectionally shut off a medium suction conduit and a medium delivery conduit.

10. A transmission according to claim 9 wherein said plunger is guided axially for sliding movement within a tubular body of said pump and has a rod with an annular piston fitted thereover which is held with axial play (L) on said plunger between two shoulders and forms, in combination with one of said shoulders, said first one-way valve means.

11. A transmission according to claim 6, wherein the differential mechanism includes a crown wheel mounted on one of said output shafts and a case having a skirt portion spaced from said crown wheel to define a space having a mouth closed removably by a lid, said skirt formed with at least one notch open at one end adjacent to said mount, said differential lock device includes a first clutch member in said space coupled for rotation with the case through said notch and a second clutch member in said space coupled for rotation with said crown wheel, said lid being attached to the case on either side of each notch to close said opening.

* * * * *